US007267468B2

(12) United States Patent
Lee et al.

(10) Patent No.: US 7,267,468 B2
(45) Date of Patent: Sep. 11, 2007

(54) FIBER DISPLAY DEVICE

(75) Inventors: Chun-Yu Lee, Tu-Cheng (TW); Ming-Chiang Tsai, Tu-Cheng (TW); Tsung-Wei Chiang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 31 days.

(21) Appl. No.: 11/140,211

(22) Filed: May 27, 2005

(65) Prior Publication Data

US 2005/0281046 A1 Dec. 22, 2005

(30) Foreign Application Priority Data

Jun. 18, 2004 (TW) ............................... 93117762 A

(51) Int. Cl.
*F21V 8/00* (2006.01)

(52) U.S. Cl. ....................................... 362/559; 362/581

(58) Field of Classification Search ........ 362/551–559, 362/581

See application file for complete search history.

(56) References Cited

U.S. PATENT DOCUMENTS 5,341,275 A * 8/1994 Ghandehari ................. 362/580
6,024,476 A * 2/2000 Wakeman ................... 362/581
6,217,188 B1 * 4/2001 Wainwright et al. ........ 362/103
6,416,800 B1 * 7/2002 Weber et al. ............... 426/104

FOREIGN PATENT DOCUMENTS

CN 2325788 Y 6/1999

* cited by examiner

*Primary Examiner*—Sandra O'Shea
*Assistant Examiner*—James W Cranson, Jr.
(74) *Attorney, Agent, or Firm*—Morris Manning & Martin LLP; Tim Tingkang Xia, Esq.

(57) ABSTRACT

A fiber display device (200) includes a light source (21), a fiber binding (27) for transmitting light beams from the light source and a brightness modulating system (29) for modulating the transmission of the light beams. The fiber binding includes a plurality of fibers (272), one terminal end of the fibers acting as a light incidence terminal for receiving light beams from the light source, the other terminal end of the fibers acting as a display terminal. The brightness modulating system is disposed between the light incidence terminal and the display terminal. This simplifies the structure and reduces the cost of the fiber display device.

19 Claims, 7 Drawing Sheets

200

272
27
29
28
21

73

732

| R | G | B | R | G | B | R |
|---|---|---|---|---|---|---|
| G | B | R | G | B | R | G |
| B | R | G | B | R | G | B |
| R | G | B | R | G | B | R |
| G | B | R | G | B | R | G |

FIBER DISPLAY DEVICE

BACKGROUND OF THE INVENTION

1. Field of the Invention

The present invention relates to a display device used to output images for commercial use or entertainment, and particularly to a fiber display device.

2. General Background

With the ongoing development of microelectronic circuitry and multimedia technology, various unique display devices have appeared on the market and gained widespread use in numerous different applications. Such display devices include liquid crystal display devices, plasma display devices, projection display devices, organic light emitting display devices, fiber display devices, and so on.

FIG. 12 shows a typical fiber display device 100. The fiber display device 100 includes a projector 1 for projecting image signals, a reflector 2 for reflecting and focusing light beams from the projector 1, a fiber binding head 3, a fiber binding 302, and a display plate 4. The fiber binding head 3 is attached to one terminal end of the fiber binding 302. The other terminal end of the fiber binding 302 abuts the display plate 4.

When the fiber display device 100 is operating, image signals from the projector 1 are reflected to the fiber binding head 3 by the reflector 2. The image signals then pass through the fiber binding 302 and are displayed on the display plate 4.

In the fiber display device 100, the image signals are produced by the projector 1 only, with the fiber binding 302 merely transmitting light beams according to the image signals. Therefore the projector 1 is, in general, expensive. Furthermore, the fiber display device 100 has a rather complicated structure. The upshot is that the fiber display device 100 is generally quite expensive.

Therefore, a new fiber display device that can overcome the above-described problems is desired.

SUMMARY

A fiber display device according to one embodiment of the invention includes a light source, a fiber binding for transmitting light beams from the light source and a brightness modulating system for modulating the transmission of the light beams. The fiber binding includes a plurality of fibers, one terminal end of the fibers acts as a light incidence terminal for receiving light beams from the light source, the other terminal end of the fibers acts as a display terminal. The brightness modulating system is disposed between the light incidence terminal and the display terminal.

The fiber display device and associated apparatus provided herein have the following advantages. In one embodiment of the invention, the brightness modulating system modulates light beams transmitted from the light incidence terminal. In particular, the brightness modulating system modulates the brightness of the light beams output from each fiber to produce desired image signals. Thus, a projector for producing image signals is not needed. This simplifies the structure and reduces the cost of the fiber display device.

Other objects, advantages and novel features will become more apparent from the following detailed description when taken in conjunction with the accompanying drawings, in which:

DETAILED DESCRIPTION OF THE PREFERRED EMBODIMENTS

Figure 1:
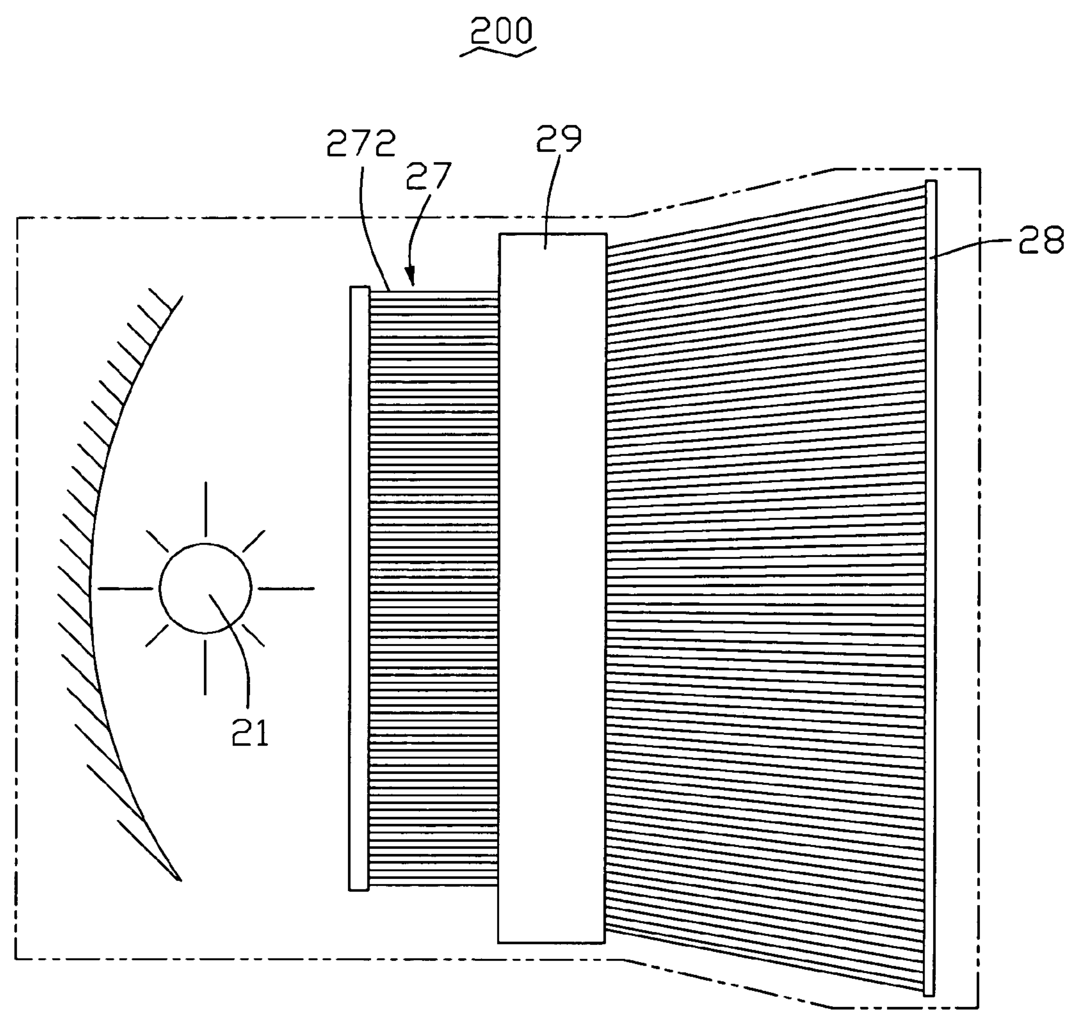
FIG. 1 is a schematic, plan view of a fiber display device according to a first embodiment of the present invention.

FIG. 1 shows a fiber display device 200 according to the first embodiment of the present invention. The fiber display device 200 includes a light source 21, a fiber binding 27, and a brightness modulating system 29. The fiber binding 27 includes a plurality of fibers 272. One terminal end of the fibers 272 acts as a light incidence terminal for receiving light beams from the light source 21, and the other terminal end of the fibers 272 acts as a display terminal. The display terminal further has an imaging system 28 facing the display terminal of the fibers 272 to generate or define images by means of treating the light beams of the light source 21. The brightness modulating system 29 is disposed between the light incidence terminal and the display terminal.

Figure 2:
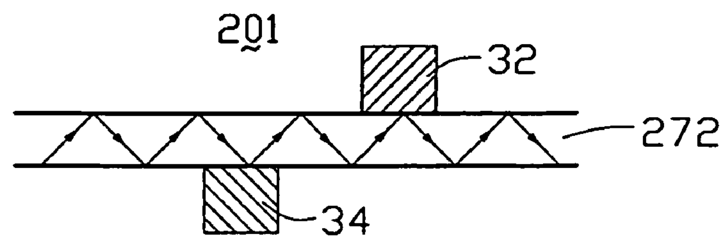
FIG. 2 and FIG. 3 are enlarged, schematic, cross-sectional plan views of operation of an optical switch of the fiber display device of FIG. 1.
Figure 3:
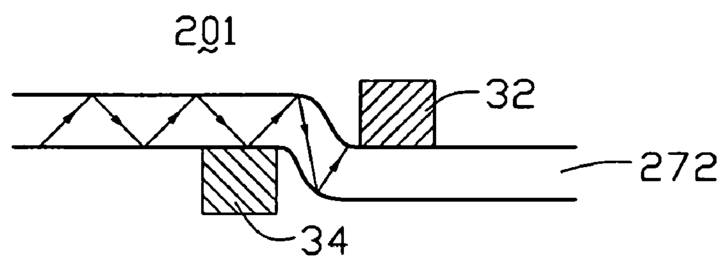

Referring to FIG. 2 and FIG. 3, the brightness modulating system 29 typically includes a plurality of first optical switches 201. Each first optical switch 201 includes two first poles 32, 34, and corresponds to one or more fibers 272. In the illustrated embodiment, the first optical switch 201 corresponds to one fiber 272 only. The first poles 32, 34 are disposed at two opposite sides of the fiber 272, and are offset from each other and parallel to each other. Each first pole 32, 34 abuts against one or more corresponding fibers 272.

As indicated in FIGS. 1-3, in operation, light beams from the light source 21 propagate through the fiber binding 27 and brightness modulating system 29, and display images on the display terminal. By moving the first poles 32, 34 a certain ratio in opposite directions to bend the fiber 272, the fiber 272 is deflected a corresponding certain ratio, and angles of incidence of incidence light from the light source 21 are changed. In this way, the intensity of the incidence light propagating through the fiber 272 is modulated, in order to modulate the brightness of the light beams output from the display terminal. Thus one or more pixels corresponding to the fiber 272 can be turned off or on.

The first poles 32, 34 may be moved and controlled by an electromagnetic relay, a micro-electromechanical device, or the like.

Figure 4:
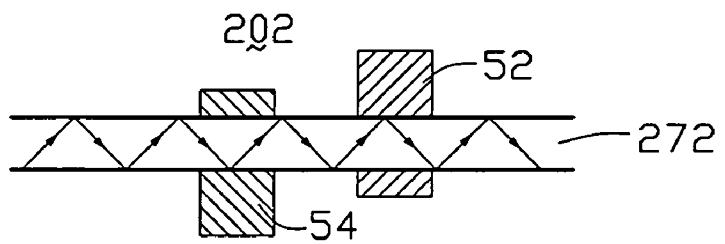
FIG. 4 and FIG. 5 are enlarged, schematic, cross-sectional plan views of operation of an alternative embodiment of an optical switch of the fiber display device of FIG. 1.
Figure 5:
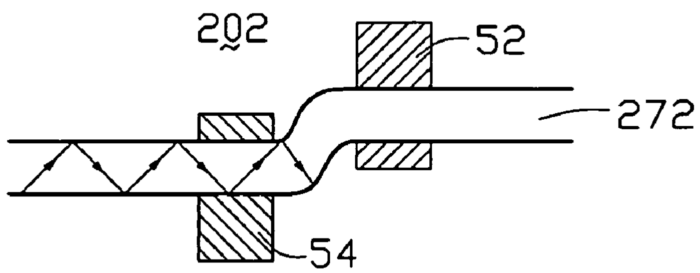

In FIG. 4 and FIG. 5, a second optical switch 202 in accordance with an alternative embodiment is shown. The second optical switch 202 typically includes two second poles 52, 54 that are parallel to each other. Each of the second pole 52, 54 has a through hole (not labeled), to hold one or more fibers 272 therein. In the illustrated embodiment, the second poles 52, 54 hold the one same fiber 272 only. By moving the second poles 52, 54 a certain ratio to bend the fiber 272 a corresponding certain ratio, angles of incidence of incidence light from the light source 21 are changed. In this way, the intensity of the incidence light propagating through the fiber 272 is modulated, in order to modulate the brightness of the light beams output from the display terminal. Thus one or more pixels corresponding to the fiber 272 can be turned off or on.

Figure 6:
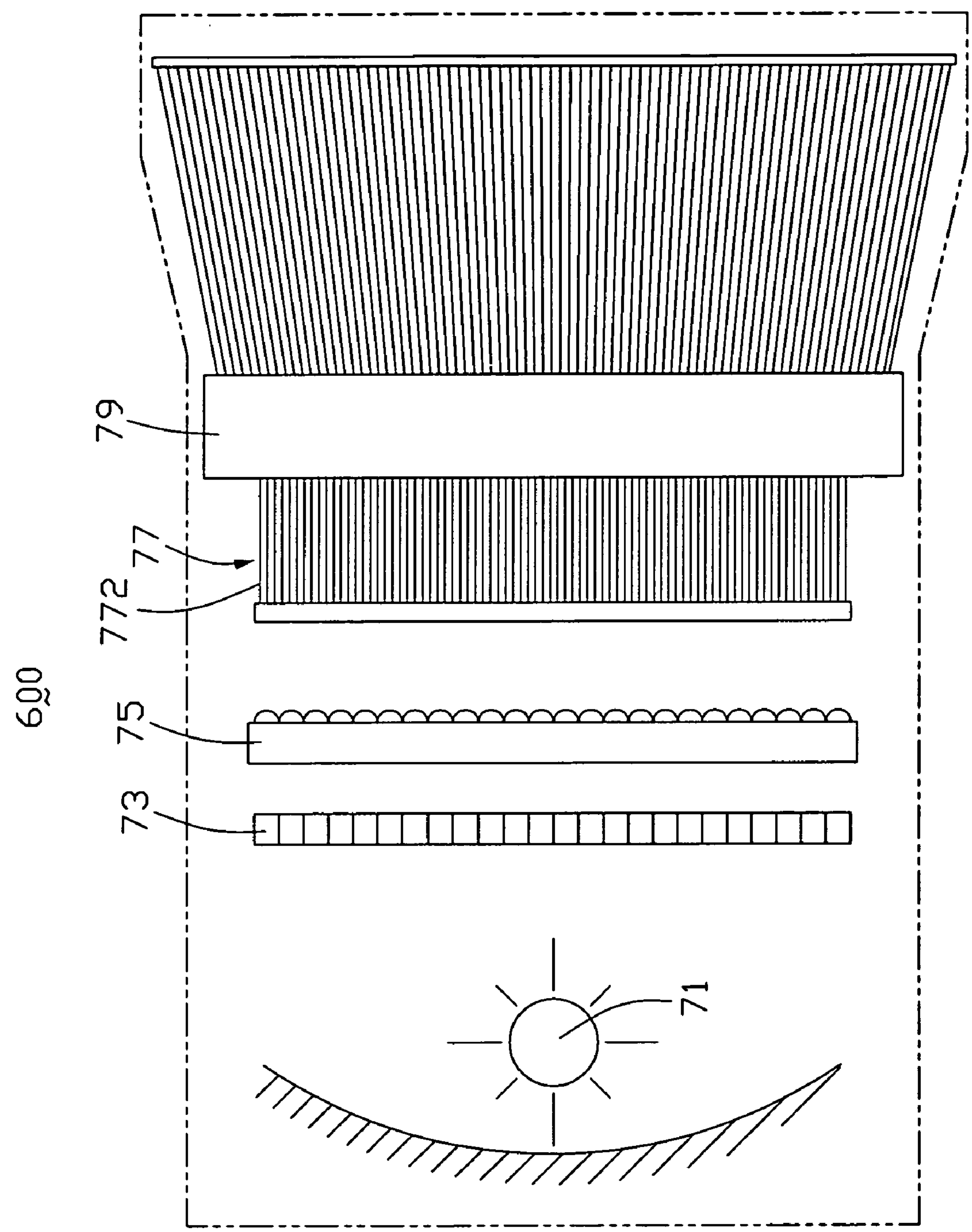
FIG. 6 is a schematic, plan view of a fiber display device according to a second embodiment of the present invention.

FIG. 6 shows a fiber display device 600 according to the second embodiment of the present invention. The fiber display device 600 includes a light source 71, an optical coupling device 75, a color filter 73 disposed between the light source 71 and the optical coupling device 75, a brightness modulating system 79, and a fiber binding 77 having a plurality of fibers 772.

Figures 7, 8:
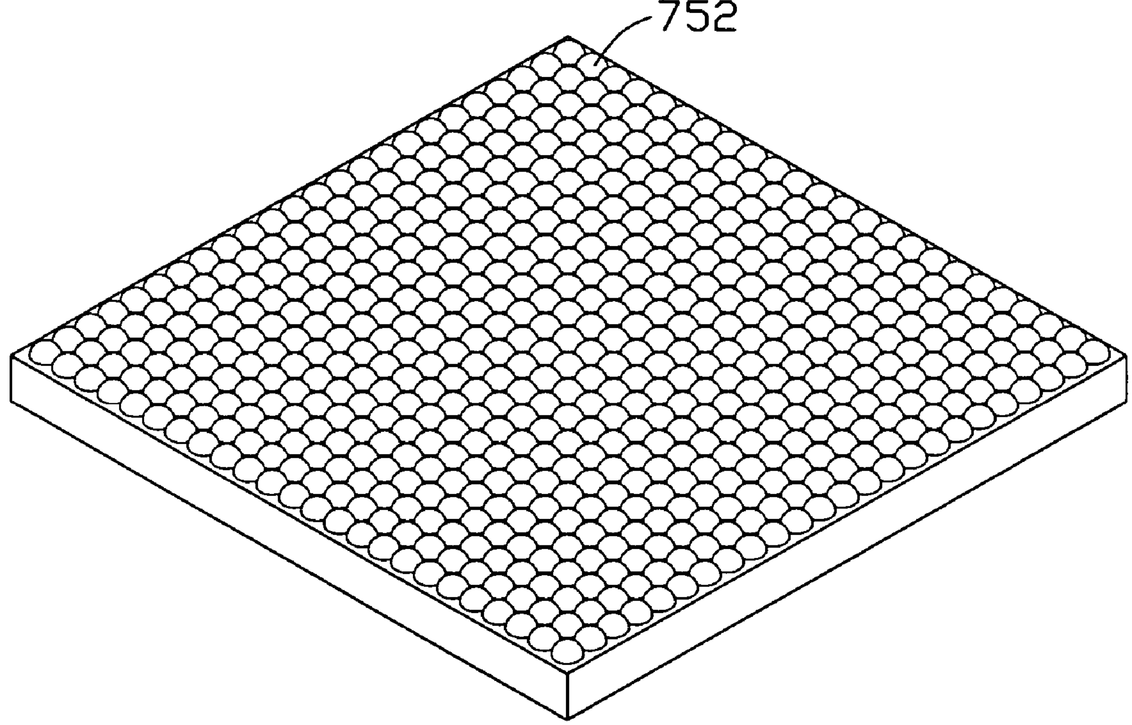
FIG. 7 is an enlarged, schematic, plan view of part of a color pattern of a color filter of the fiber display device of FIG. 6.
FIG. 8 is an isometric view of an optical coupling device of the fiber display device of FIG. 6.

Referring to FIG. 7, part of a color pattern 732 of the color filter 73 is shown. The color pattern 732 includes three colors: red, green and blue.

Referring to FIG. 8, the optical coupling device 75 of the fiber display device 600 is shown. The optical coupling device 75 is a micro convex lenses matrix, which includes a plurality of convex micro lens units 752 corresponding to the color pattern 732. That is, each convex micro lens unit 752 corresponds to one or more fibers 772 at the light incidence terminal.

Figure 9:
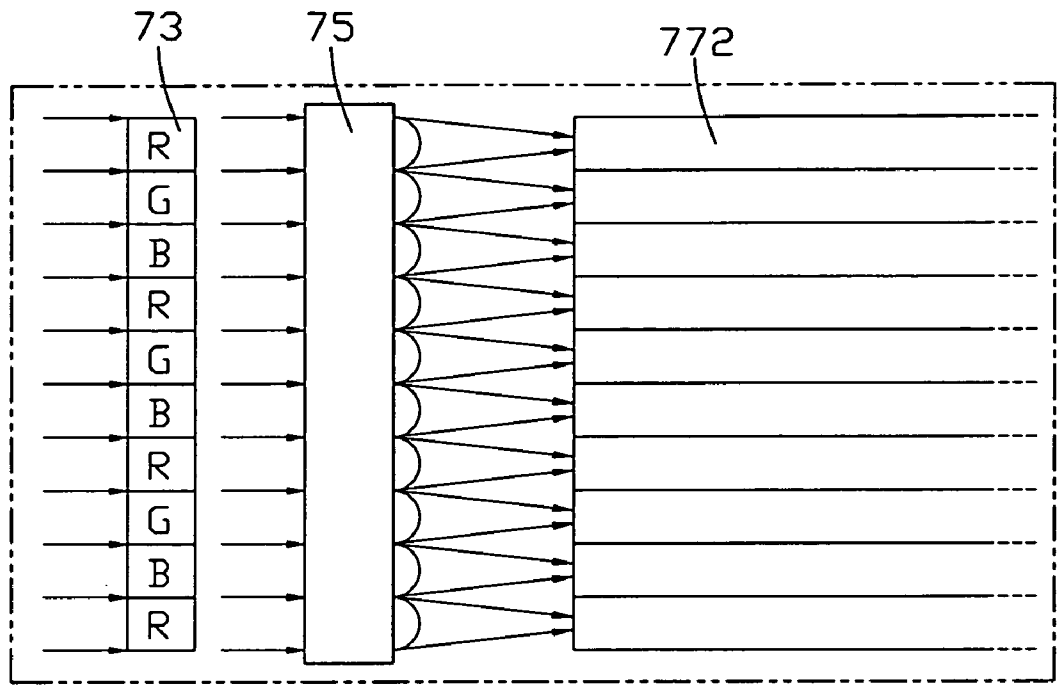
FIG. 9 is an enlarged, schematic, plan view of operation of certain parts of the fiber display device of FIG. 6.
Figure 10:
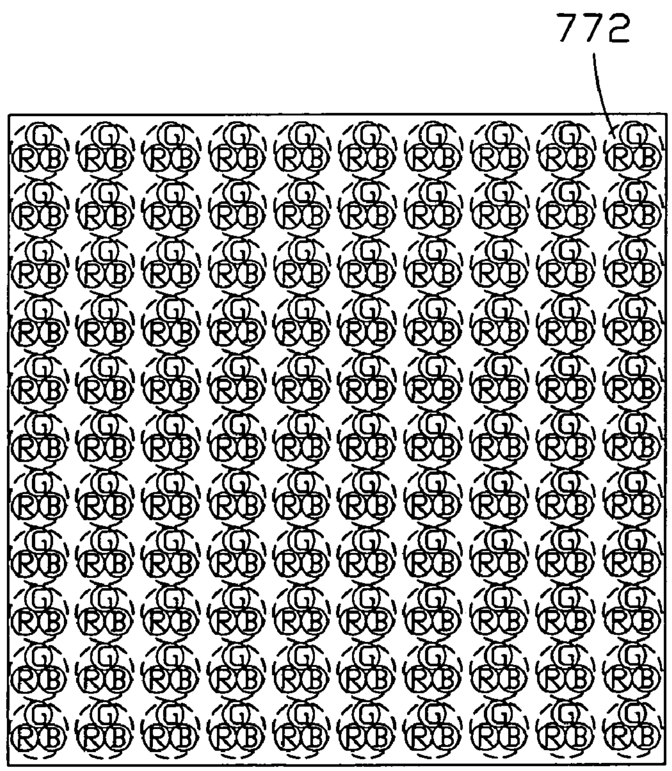
FIG. 10 is an enlarged, schematic, end view of optical coupling of fibers of the fiber display device of FIG. 6.

Referring to FIG. 9 and FIG. 10, light beams from the light source 71 propagate through the color filter 73 and enter the optical coupling device 75. Through the color filter 73, white light beams can be transformed into three primary colors: red, green and blue. Then the light beams are coupled into the corresponding fibers 772 by the optical coupling device 75. The three primary-colored light beams enter the optical coupling device 75, and are coupled into corresponding fibers 772 by the optical coupling device 75. In the brightness modulating system 79, the primary-colored light beams are modulated and thereby mixed in certain combinations and in certain proportions in order to output desired colors from the display terminal.

As shown in FIG. 10, with the combination of different colors in different proportions of primary-colored light received from the fibers 772 at the display terminal, various desired images can be displayed. That is, the fibers 772 at the display terminal cooperate to act as one or more pixels according to the proportions of red, green and blue light that they carry.

With the above configuration, the fiber display device 600 can display full-colored images. Light beams from the light source 71 propagate through the optical coupling device 75, which reduces intensity loss and improves the ratio of utilization of light beams.

Figure 11:
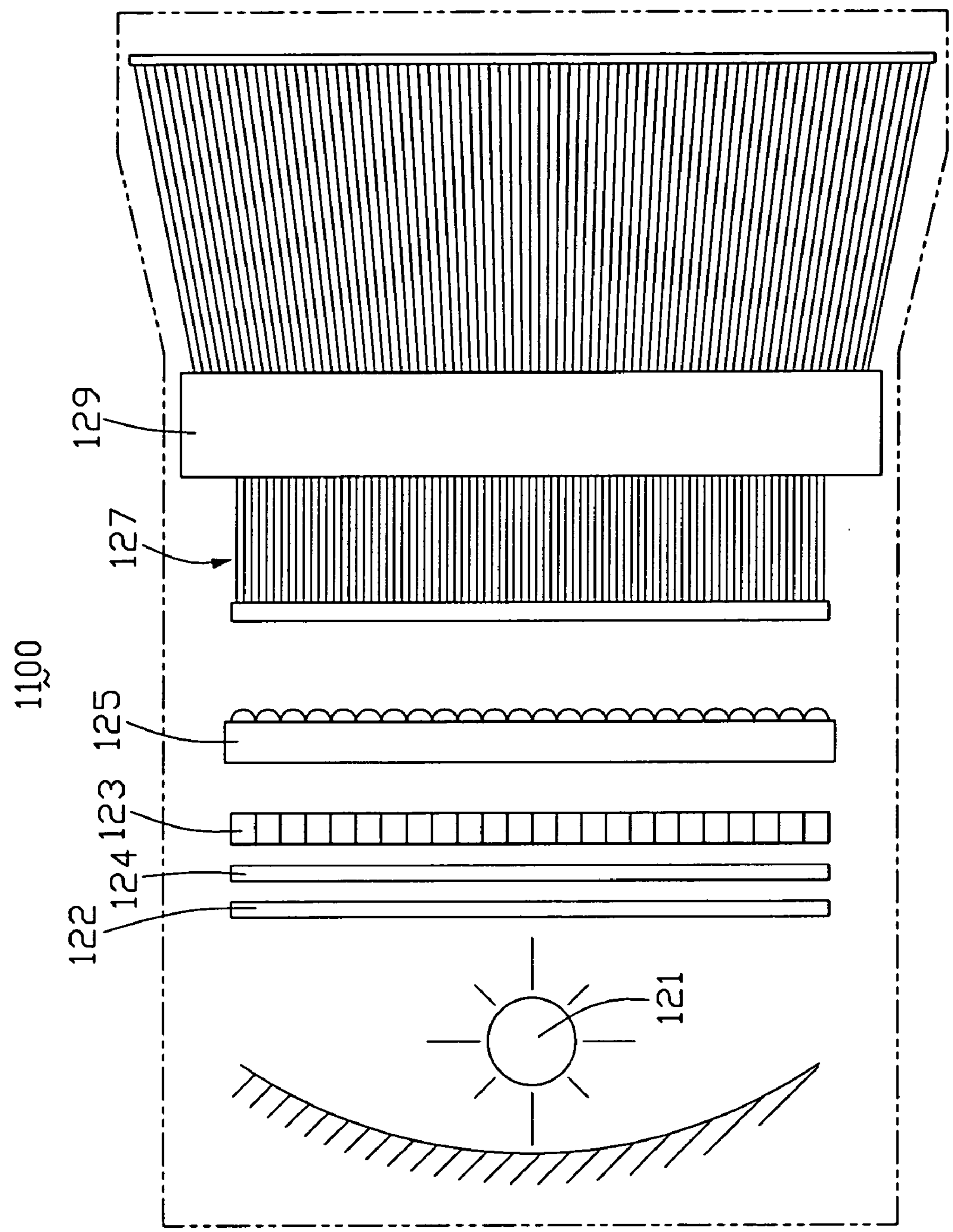
FIG. 11 is a schematic, plan view of a fiber display device according to a third embodiment of the invention.
Figure 12:
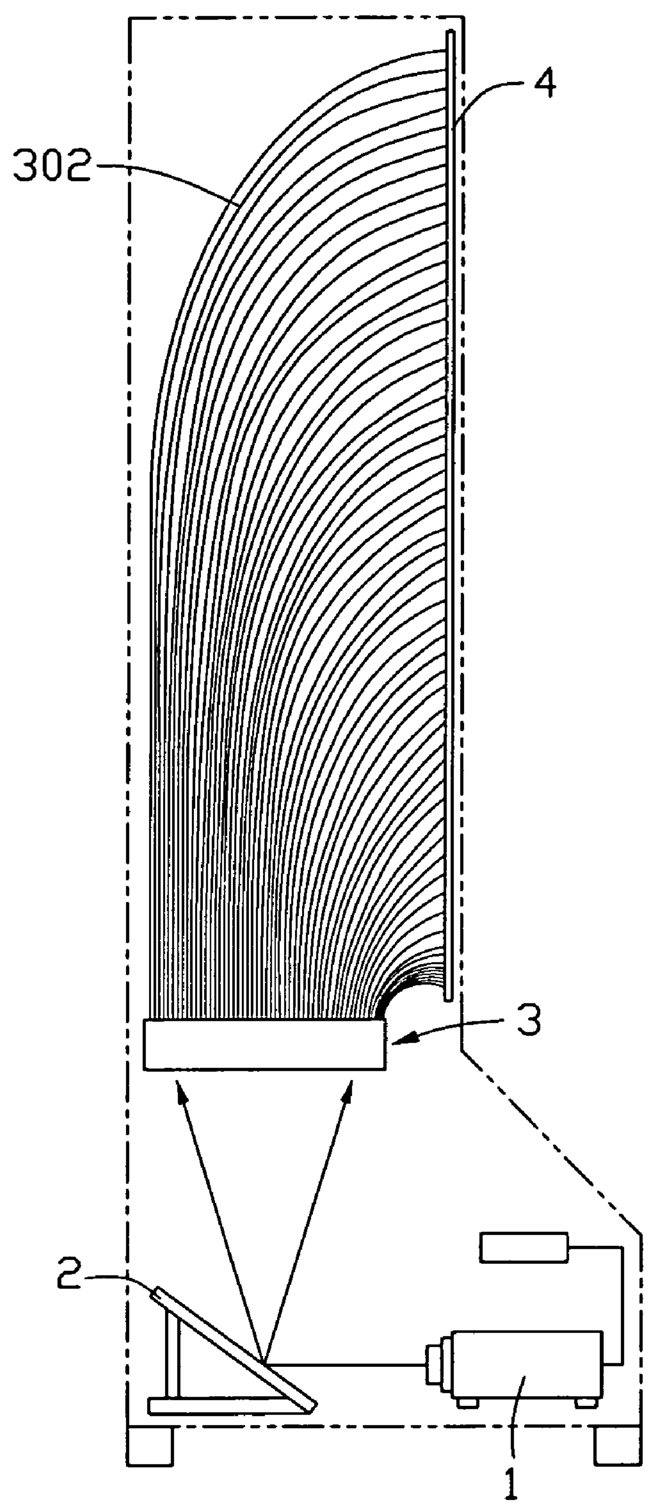
FIG. 12 is a schematic, plan view of a conventional fiber display device.

FIG. 11 shows a fiber display device 1100 according to the third embodiment of the present invention. The fiber display device 1100 includes a light source 121, a band-pass filter 122, a diffusion film 124, a color filter 123, an optical coupling device 125, a fiber binding 127, and a brightness modulating system 129. The band-pass filter 122 and the diffusion film 124 are disposed between the color filter 123 and the light source 121, with the band-pass filter 122 being adjacent to the light source 121.

In operation, light beams from the light source 121 may include ultraviolet rays and infrared rays. The ultraviolet rays may reduce the performance of glass and sealant. The infrared rays may produce too much heat, which may unduly increase the temperature of the fiber display device 1100. Thus, when light beams from the light source 121 enter the band-pass filter 122, only visible light rays can pass therethrough. The band-pass filter 122 prevents ultraviolet rays and infrared rays from passing therethrough. The visible light beams transmitting from the band-pass filter 122 propagate through the diffusion film 124, the color filter 123, the optical coupling device 125, the fiber binding 127 and the brightness modulating system 129, and display desired images at the display terminal of the fiber binding 127. Thus no ultraviolet rays or infrared rays can damage the various optical elements beyond the band-pass filter 122, and performance of the fiber display device 1100 is improved. Further, the diffusion film 124 scatters light beams propagating therethrough, thereby improving the uniformity of light beams output therefrom.

As a substitute for the band-pass filter 122, another kind of filter unit may be provided in order to prevent ultraviolet rays and the infrared rays from continuing on to the color filter 123. The filter unit typically includes an ultraviolet-rays filter to prevent ultraviolet rays from passing therethrough, and an infrared-ray filter to prevent infrared rays from passing therethrough.

In summary, the fiber display device 200 and associated apparatus provided herein have the following advantages. In one aspect, the brightness modulating system 29 modulates light beams transmitted from the light incidence terminal. In particular, the brightness modulating system 29 modulates the brightness of the light beams output from each fiber 272 to produce desired image signals. Thus, a projector for producing image signals is not needed. This simplifies the structure and reduces the cost of the fiber display device 200. In another aspect, the color filer 73 and the optical coupling device 75 enable the fiber display device 600 to display full-colored images. In still another aspect, the band-pass filter 122 and the diffusion film 124 are arranged between the light source 121 and the optical coupling device 125 of the fiber display device 1100. The band-pass filter 122 can filter ultraviolet rays and infrared rays to reduce the temperature of the fiber display device 1100. The diffusion film 124 diffuses light beams transmitted from the light source 121, resulting in uniform output of light beams from the display terminal.

The color pattern 732 may be manufactured using any of a variety of methods such as printing, dyeing, etching or dispersion. In addition, the color filter 73 may be defined by a plurality of intervening films. The intervening films can be formed on a side of the optical coupling device 75, by any of a variety of methods such as coating by vaporization, sputtering, etc. The optical coupling device 75 and the fibers 772 may be formed as a single unitary body in order to reduce coupling loss.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A fiber display device comprising:

a light source;

a fiber binding for transmitting light beams from the light source; and a brightness modulating system configured for modulating the transmission of the light beams;

wherein the fiber binding comprises a plurality of fibers, one terminal end of the fibers defines a light incidence terminal for receiving the light beams from the light source, another terminal end of the fibers defines a display terminal, and the brightness modulating system is disposed between the light incidence terminal and the display terminal.

2. The fiber display device according to claim 1, wherein the brightness modulating system comprises a plurality of optical switches.

3. The fiber display device according to claim 2, wherein each optical switch is configured for controlling one or more corresponding fibers.

4. The fiber display device according to claim 3, wherein each optical switch comprises two poles.

5. The fiber display device according to claim 4, wherein the poles are parallel to each other.

6. The fiber display device according to claim 4, wherein each pole defines a hole.

7. The fiber display device according to claim 6, wherein one or more corresponding fibers are held in the hole.

8. The fiber display device according to claim 1, further comprising a color filter disposed between the light source and the brightness modulating system.

9. The fiber display device according to claim 8, wherein a single fiber or a combination of fibers at the display terminal act as a display pixel unit providing a desired output of red, green or blue light or any combination thereof.

10. The fiber display device according to claim 1, further comprising an optical coupling device disposed at the light incidence terminal of the fiber binding.

11. The fiber display device according to claim 10, wherein the optical coupling device is a micro lens matrix comprising a plurality of micro lens units.

12. The fiber display device according to claim 11, wherein each micro lens unit corresponds to one or more fibers at the light incidence terminal.

13. The fiber display device according to claim 1, further comprising a band-pass filter disposed between the light source and the brightness modulating system.

14. The fiber display device according to claim 13, further comprising a diffusion film disposed between the band-pass filter and the brightness modulating system.

15. A method for display, comprising the steps of: providing a light source generating predetermined light beams; transmitting said light beams for said display by means of a fiber binding having a plurality of optical fibers; and modulating said light beams during transmission of said light beams in said fiber binding by means of mechanically bending said optical fibers so as to control brightness of said light beams for said display.

16. The fiber display device according to claim 1, further comprising an imaging system facing the display terminal, the imaging system configured for receiving the transmitted light beams and treating the received light beams to generate or define desired images.

17. The fiber display device according to claim 4, wherein the two poles are disposed at two opposite sides of one or more corresponding fibers, and the two poles are offset from each other.

18. The method according to claim 15, wherein a brightness modulating system disposed at said fiber binding is used for mechanically bending said optical fibers, said brightness modulating system comprises a plurality of optical switches, and each optical switch comprises two poles.

19. A fiber display device comprising:

a light source providing predetermined light beams without any image definition;

a fiber binding having a plurality of optical fibers and having a terminal end facing said light source so as to receive said light beams from said light source and transmit said light beams to another terminal end thereof spaced from said light source;

an imaging system neighboring and facing said another terminal end of said fiber binding for receiving said transmitted light beams and being capable of treating said light beams with predetermined image definitions; and a brightness modulating system disposed at said fiber binding for controlling brightness of said light beams through said fiber binding, said brightness modulating system comprising a plurality of optical switches, each of which comprises two poles.

* * * * *